US007881292B2

(12) United States Patent
Sakanashi et al.

(10) Patent No.: US 7,881,292 B2
(45) Date of Patent: Feb. 1, 2011

(54) COMMUNICATION DEVICE AND CONTROL METHOD FOR THE SAME

(75) Inventors: Kenji Sakanashi, Fukuoka (JP); Hiroyuki Matsumoto, Fukuoka (JP)

(73) Assignee: Panasonic Corporation, Osaka (JP)

( * ) Notice: Subject to any disclaimer, the term of this patent is extended or adjusted under 35 U.S.C. 154(b) by 240 days.

(21) Appl. No.: 11/773,761

(22) Filed: Jul. 5, 2007

(65) Prior Publication Data
US 2008/0008197 A1 Jan. 10, 2008

(30) Foreign Application Priority Data
Jul. 7, 2006 (JP) ............................... 2006-187561

(51) Int. Cl.
*H04L 12/28* (2006.01)
(52) U.S. Cl. ........................ 370/389; 370/352; 370/396; 370/401; 370/493
(58) Field of Classification Search ................. 370/352, 370/389, 396, 401, 493
See application file for complete search history.

(56) References Cited

U.S. PATENT DOCUMENTS

| 6,070,187 | A  | * | 5/2000  | Subramaniam et al. ..... 709/220 |
| 6,587,455 | B1 | * | 7/2003  | Ray et al. .................... 370/352 |
| 6,697,864 | B1 | * | 2/2004  | Demirtjis et al. ............ 709/229 |
| 6,807,184 | B2 | * | 10/2004 | Gutknecht et al. .......... 370/401 |
| 6,952,428 | B1 | * | 10/2005 | Necka et al. ................ 370/466 |
| 6,957,276 | B1 | * | 10/2005 | Bahl ........................... 709/245 |
| 7,020,720 | B1 | * | 3/2006  | Donahue et al. ............ 709/245 |
| 7,072,337 | B1 | * | 7/2006  | Arutyunov et al. .......... 370/389 |
| 7,099,338 | B1 | * | 8/2006  | Lee ............................. 370/401 |
| 7,450,564 | B2 | * | 11/2008 | Han ............................ 370/352 |
| 2002/0062485 | A1 | * | 5/2002 | Okano et al. ................. 725/111 |
| 2002/0138614 | A1 | * | 9/2002 | Hall ........................... 709/225 |
| 2003/0084162 | A1 | * | 5/2003 | Johnson et al. ............. 709/227 |
| 2003/0101243 | A1 | * | 5/2003 | Donahue et al. ............ 709/220 |
| 2003/0174714 | A1 | * | 9/2003 | Manik et al. ................. 370/396 |
| 2005/0114492 | A1 | * | 5/2005 | Arberg et al. ............... 709/223 |
| 2005/0157703 | A1 | * | 7/2005 | Roh ........................... 370/352 |
| 2005/0204062 | A1 | * | 9/2005 | Sekine et al. ............... 709/245 |
| 2005/0265257 | A1 | * | 12/2005 | Masuda ....................... 370/254 |
| 2006/0182255 | A1 | * | 8/2006 | Luck et al. ............. 379/220.01 |
| 2006/0209723 | A1 | * | 9/2006 | Nakamura ................... 370/254 |
| 2006/0280189 | A1 | * | 12/2006 | McRae et al. ............... 370/401 |

FOREIGN PATENT DOCUMENTS

JP 2005 197793 7/2005

* cited by examiner

*Primary Examiner*—Ayaz R Sheikh
*Assistant Examiner*—Andrew C Lee
(74) *Attorney, Agent, or Firm*—Dickinson Wright PLLC

(57) ABSTRACT

A communication device carries out a routing operation of data between a first network and a second network. The communication device comprises: a first interface connected to the first network; a second interface connected to the second network; and a processor that assigns an IP address to a user terminal device connected to the first interface in accordance with a DHCP. The processor changes a first lease period of the IP address set when the processor assigns the IP address to the user terminal device in accordance with the change of a network environment.

15 Claims, 4 Drawing Sheets

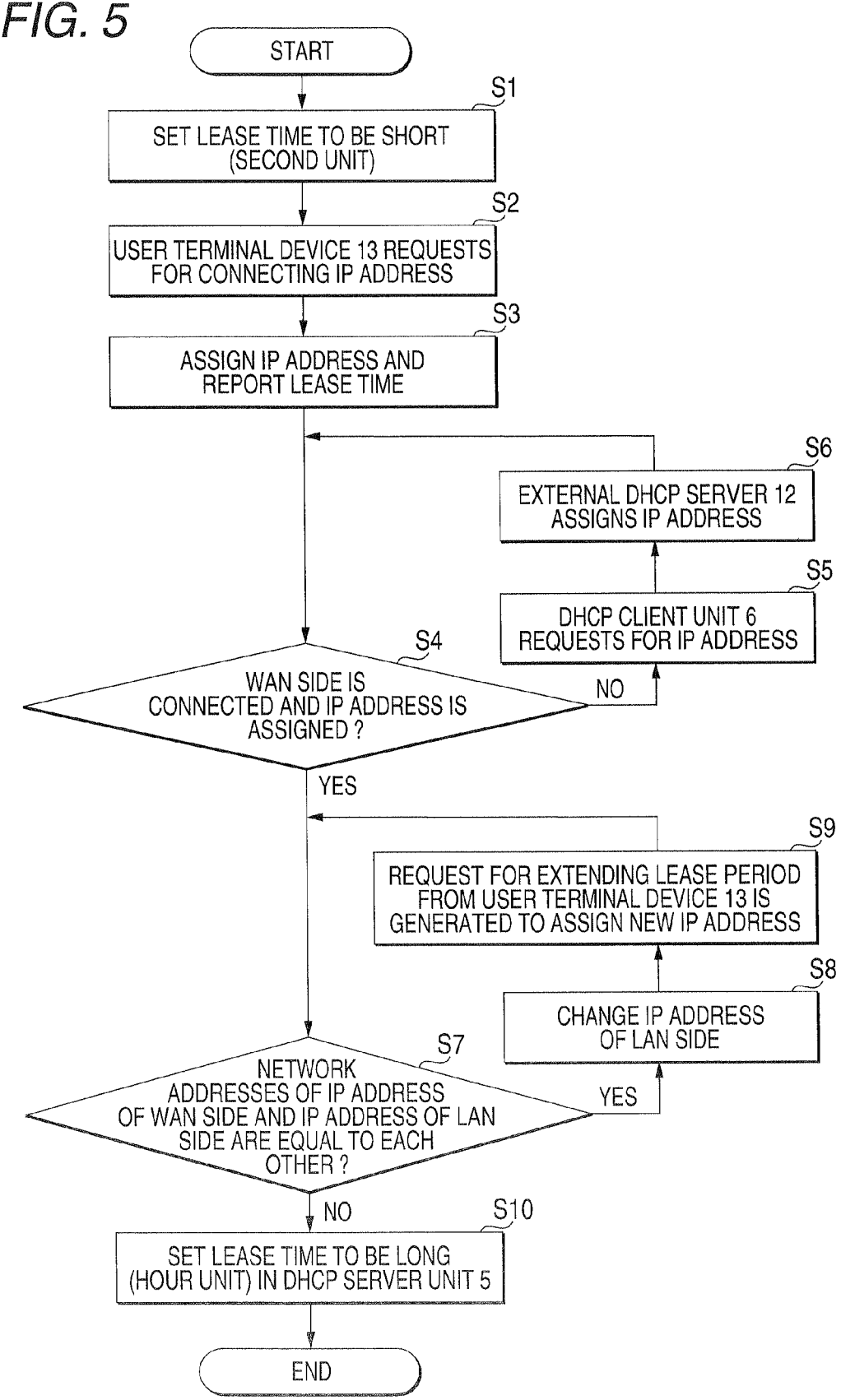

COMMUNICATION DEVICE AND CONTROL METHOD FOR THE SAME

BACKGROUND

The present invention relates to a communication device such as a router provided between an external network represented by an internet and user terminal devices such as a PC (Personal Computer) or an IP (Internet Protocol) telephone to carry out a filtering operation or a routing operation of packets distributed between networks and a control method for the communication device.

In recent years, with the growth of an internet or a broad band environment, IP terminal devices have been rapidly spread in enterprises or homes. When user terminal devices (IP terminals) composed of a plurality of PCs or IP telephones are connected to an external network such as the internet, as has been popularized, a router device is disposed at an inlet of the internet so that a communication device such as a router is allowed to carry out a routing operation between the plurality of user terminal devices in the homes or the enterprises and the external network.

Most of the routers have DHCP server functions to select one IP address from an address pool held by itself and assign the IP address to the user terminal device connected to an inner side of a LAN by the DHCP server function.

When the IP address is assigned to the user terminal device, the router sets a lease period of the IP address and informs a user terminal device 113 of a DHCP message including the lease period. Ordinarily, the above-described lease period is set to a fixed value, for instance, one hour. After the lease period elapses, a right of using the assigned IP address is released. Accordingly, the user terminal device needs to send to the router a request for extending the lease period (a request for extension) until the end of the lease period.

A time provided until the request for extending the lease period is outputted after the IP address is assigned to the user terminal device is prescribed as a Renewing Time in the protocol of the DHCP. In a default, the Renewing Time is set to ½ as long as the lease period. When the DHCP server of the router does not respond to the request for extending again the lease period, after a Rebinding Time in the default set to ⅞ as long as the lease period elapses, the user terminal device transmits again a packet for searching the DHC server.

On the other hand, an IP address is assigned to a WAN side of the router device connected to the external network from an external DHCP server existing on the external network. Since the assigned IP address is set irrespective of the IP address set to the LAN side of the router device, the network address of the WAN side of the router device may be possibly the same as the network address of the LAN side.

For instance, there is a case that under a state where a private address of 192.168.0.254/24 is set to the LAN side, a private address having the same network address of 192.168.0.1/254 is set to the WAN side.

In such a case, since the router has the same segment in the WAN side and the LAN side, the router cannot decide to which interface a packet supplied to the router is to be routed to generated a state that a communication cannot be made.

In the above-described usual structure, when the network addresses of the WAN side and the LAN side of the router are duplicated, since the lease period of the IP address by the DHCP server function of the router is set to the fixed value of a long time such as one hour, the Renewing Time is also set to the long time such as 30 minutes half as long as the lease period. Thus, a problem arises that the user terminal device is brought into a state that the communication cannot be made until the Renewing Time elapses.

Further, a method for shortening the lease period to a second unit may be carried out. However, when this method is employed, problems arise that the packets of the DHCP are frequently distributed on the network of the LAN side, which is not preferable in view of a quantity of traffic, and the processing performance of the user terminal device or the router is deteriorated.

SUMMARY

A communication device carries out a routing operation of data between a first network and a second network. The communication device comprises: a first interface connected to the first network; a second interface connected to the second network; and a processor that assigns an IP address to a user terminal device connected to the first interface in accordance with a DHCP. The processor changes a first lease period of the IP address set when the processor assigns the IP address to the user terminal device in accordance with the change of a network environment.

Thus, since the lease period of the IP address to the user terminal device is not set to the fixed value and can be varied, the frequency of generation of requests for extending the lease period from the user terminal device can be controlled to improve a communication efficiency to the user terminal device.

BRIEF DESCRIPTION OF THE DRAWINGS

FIG. 5 is a flowchart of an operation of the router device in the first embodiment.

DETAILED DESCRIPTION

Now, embodiments of the present invention will be described below. These embodiments may be mutually employed within a related range.

In below-described embodiments, as a communication device for relaying data between a first network and a second network, a router is described as an example, however, other device having a router function or a computer may be employed.

First Embodiment

Figure 1:
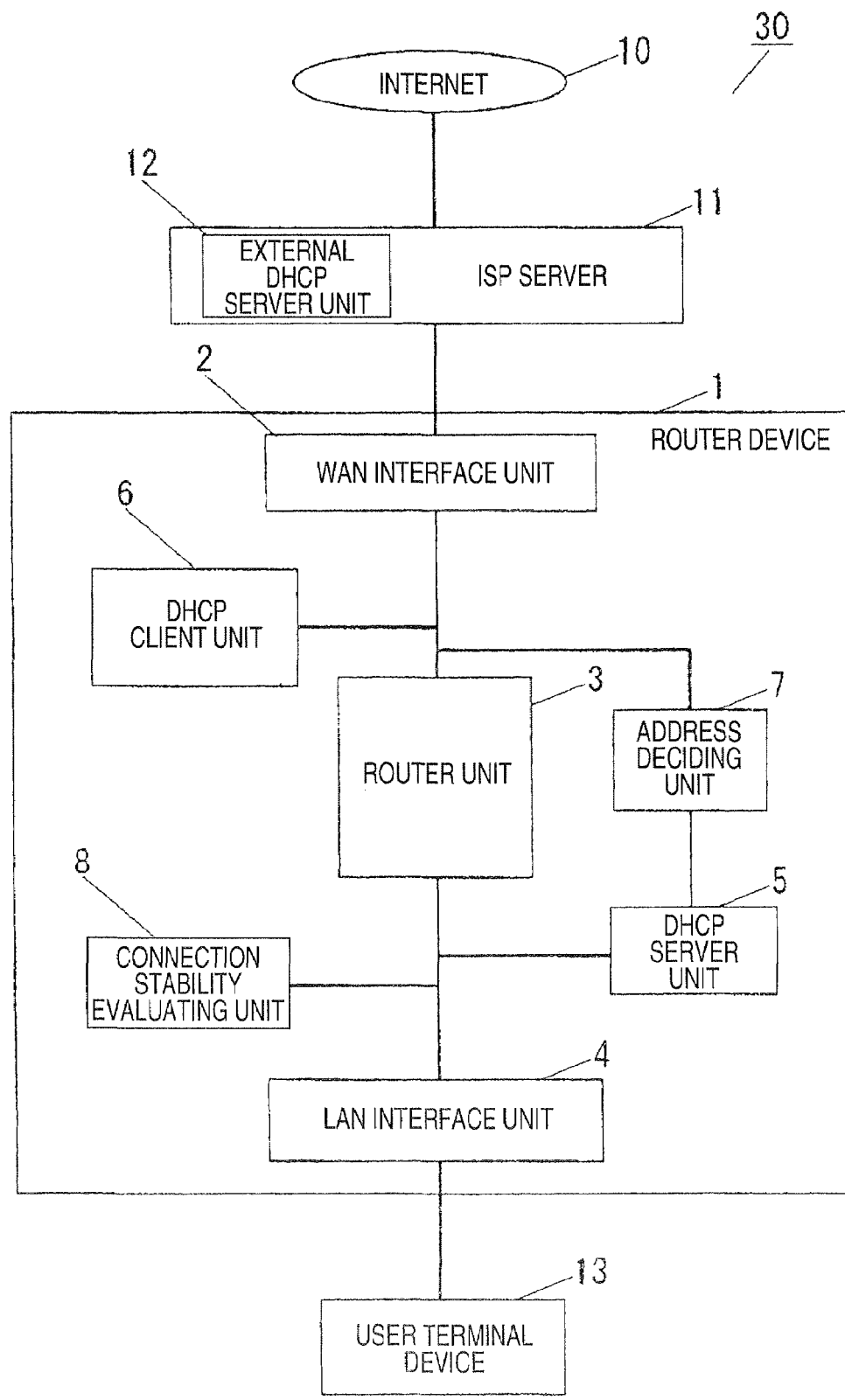
FIG. 1 is a diagram showing the structure of a communication system including a router device according to a first embodiment.

FIG. 1 is a diagram showing the structure of a communication system including a router device according to a first embodiment.

In FIG. 1, a communication system 30 include a router device for relaying a data communication between an external network (a second network) including an internet 10 and a LAN (Local Area network) as an internal network (a first network). Further, the router device 1 is connected to an ISP server 11 through a WAN (Wide Area Network) interface unit 2 and connected to a user terminal device 13 through a LAN interface unit 4.

Reference numeral 11 designates the ISP (Internet Service Provider) server located on the external network and connected to the router device 1. The ISP server 11 includes an external DHCP (Dynamic Host Configuration Protocol) server unit 12 that assigns an IP address to the WAN interface unit 2 of the router device 1.

Reference numeral 13 designates the user terminal device (IP terminal device) such as one to a plurality of PCs or IP telephones. Between the ISP server 11 and the WAN interface 2 and between the user terminal device 13 and the LAN interface unit 4, other routers or hubs may be respectively provided.

In the router device 1, 2 designates the WAN interface unit for connecting the router device to the external network and any of communication units or communication protocols such as a communication using Ethernet (a registered trademark), an optical fiber, a telephone line, a radio and a power line may be selected that can be used in ordinary homes or enterprises.

Reference numeral 3 designates a router unit having original functions of a router such as a routing function of data or a packet filtering function.

Reference numeral 4 designates the LAN interface unit for connecting the router device to one to a plurality of user terminal devices 13 existing on the internal network such as the LAN. As the LAN interface unit 4, any of communication units or communication protocols may be selected like the WAN interface unit 2.

Reference numeral 5 designates a DHCP server unit for assigning IP addresses respectively to the user terminal devices 13 connected to the LAN interface unit 4.

Reference numeral 6 designates a DHCP client unit for obtaining the IP address of the WAN interface unit 2.

Reference numeral 7 designates an address deciding unit for deciding whether or not the IP address assigned to the WAN interface unit 2 and the IP address of the LAN interface unit 4 have the same network address.

Reference numeral 8 designates a connection stability evaluating unit for evaluating the stability of a connection between the LAN interface unit 4 and the user terminal device 13.

Figure 2:
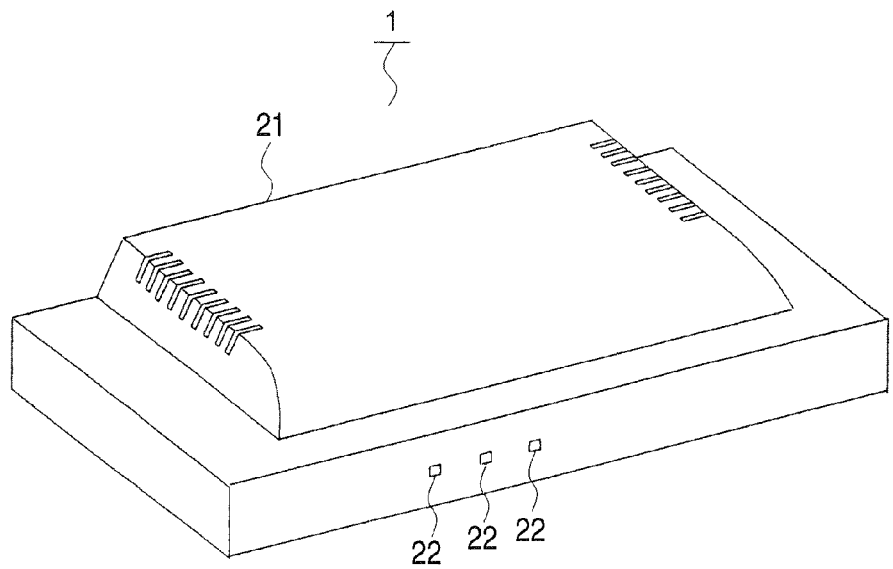
FIG. 2 is a perspective view of the router device of the first embodiment.
Figure 3:
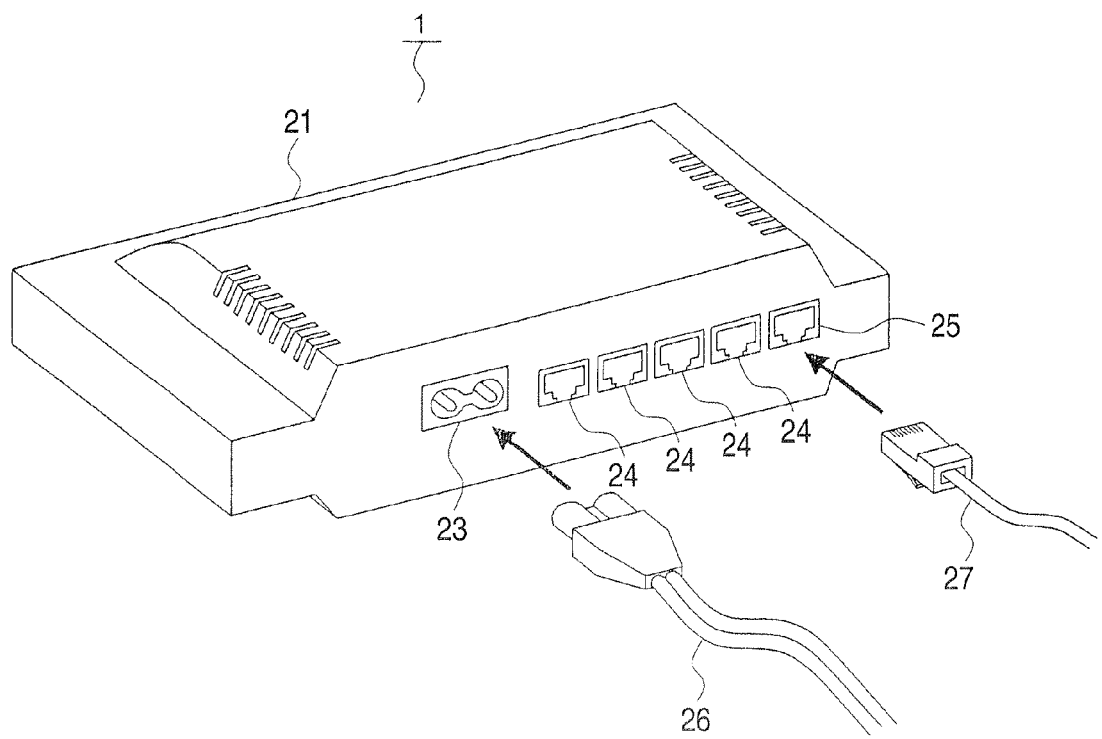
FIG. 3 is a perspective view of the router device in the first embodiment.

Reference numeral FIGS. 2 and 3 show perspective views of the router device in the first embodiment. FIG. 2 shows the router device viewed from a front part and FIG. 2 shows the router device viewed from a rear part.

In FIG. 2, the router device 1 has a casing 21. On the front surface of the casing 21, display parts 22 of LEDs (Light Emitting Diode) are provided. On the rear surface of the casing 21, as shown in FIG. 3, a DC (Direct Current) power connector 23, modular jacks 24 for the LAN (Local Area Network) such as RJ 45 and a modular jack 25 for the WAN (Wide Area Network) are provided. To the DC power connector 23, an electric power line 26 such as parallel cables is connected. To the modular jacks 24 and 25, a LAN cable 27 is connected.

Figure 4:
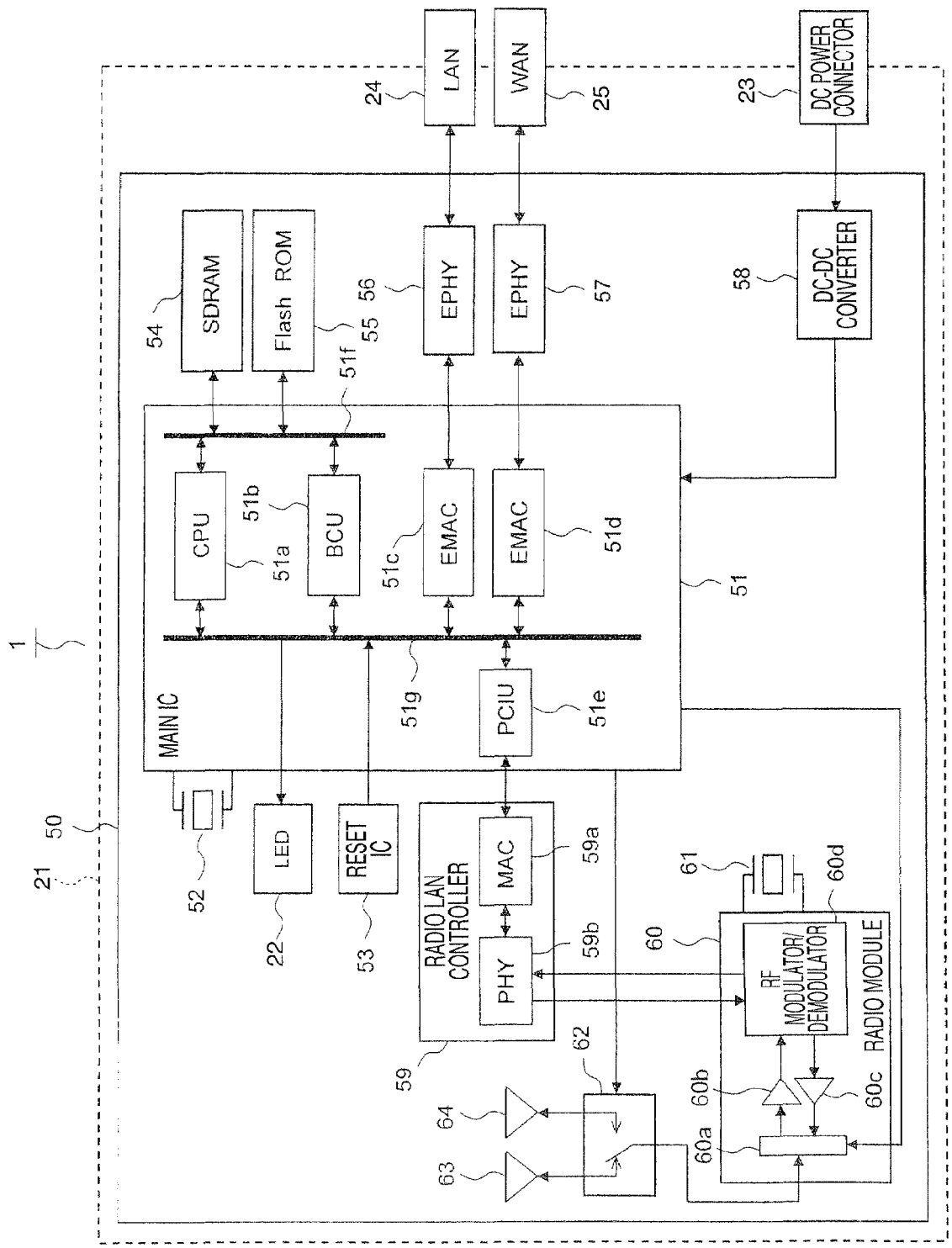
FIG. 4 is a diagram showing a hardware structure of the router device in the first embodiment.

FIG. 4 is a diagram showing a hardware structure of the router device in the first embodiment. The router device 1 includes a circuit module 50 in the casing 21 shown by a broken line as shown in FIG. 4.

In the circuit module 50, a main IC (Integrated Circuit) 51, a radio LAN controller 59 and a radio module 60 are mounted.

The main IC 51 includes a CPU (Central Processing Unit) 51$a$, a bus such as a main bus 51$f$ or a local bus 51$g$, a BCU (Bus Control Unit) 51$b$ for controlling the flow of data on the bus, MAC blocks (EMAC) 51$c$ and 51$d$ for controlling a MAC (Medium Access Control) layer of Ethernet (registered trademark), a PCIU 51$e$ for controlling a PCI (Peripheral Component Interconnect Unit) bus.

The CPU 51$a$ and BCU 51$b$ in the main IC 51 are connected to a SDRAM (Synchronous Dynamic Random Access Memory) 54 and a Flash ROM (Flash Read Only Memory) 55 through the main bus 51$f$. Further, the CPU 51$a$ and the BCU 51$b$ are connected to an oscillator 52 for supplying a clock to the main IC 51, the display part 22 such as the LED and a reset IC 53 for outputting an initializing signal to the main IC 51 through the local bus 51$g$.

The MAC blocks 51$c$ and 51$d$ in the main IC 51 are respectively connected to PHY (PHYsical layer). IC 56 and IC 57 for controlling a physical layer of the Ethernet (registered trademark). The PHYICs 56 and 57 are respectively connected to the modular jack 24 for the LAN and the modular jack 25 for the WAN. Further, the main IC 51 is connected to the DC power connector 23 through a DC-DC (Direct Current to Direct Current) converter 58. The DC-DC converter 58 converts a DC voltage supplied from the DC power connector 23 to a DC voltage necessary for the main IC 51.

The radio module 60 includes a transmit and receive switching SW (Switch) 60$a$ in which a transmitting or receiving state is set from the main IC 51, an LNA (Low Noise Amplifier) 60$b$ for amplifying a receiving signal, a PA (Power Amplifier) 60$c$ for amplifying a transmitting signal and an RF (Radio Frequency) modulator/demodulator 60$d$ for modulating to a radio signal and demodulating from a radio signal.

The radio module 60 is connected to an oscillator 61 for supplying a clock to the radio module 60. The RF modulator/demodulator 60$d$ in the radio module 60 is connected to a PHY block 59$b$ in the radio LAN controller 59. The transmit and receive switching SW 60$a$ in the radio module 60 is connected to antennas 63 and 64 through an antenna switching SW 62 for switching an antenna used from the main IC 51.

Now, a corresponding relation between the structure shown in FIG. 1 and the structure shown in FIG. 4 will be described below.

The WAN interface unit 2 is realized by the modular jack 25 for the WAN and the EPHY 57 and forms a physical interface of the WAN side to transmit and receive data supplied in the WAN side between the main IC 51 and the WAN interface 2. Further, the radio LAN controller 59 and the radio module 60 and the antennas 63 and 64 may be used as the interface of the WAN side.

The LAN interface unit 4 is realized by the modular jack 24 for the LAN and the EPHY 56 and forms a physical interface of the LAN side to transmit and receive data supplied in the LAN side between the main IC 51 and the LAN interface 4. Further, the radio LAN controller 59 and the radio module 60 and the antennas 63 and 64 may be used as the interface of the LAN side.

The router unit 3, the DHCP server unit 5, the DHCP client unit 6 and the connection stability evaluating unit 8 are realized by the main IC 51, the SDRAM 54 and the Flash ROM 55. A program stored in the Flash ROM 55 is loaded on the SDRAM 54 and executed by a processor of the main IC 51 to realize various kinds of functions.

The router device 1 sets, for instance, a time ½ times as long as a time until a lease period elapses after the IP address is obtained to a Renewing Time of default in the user terminal device 13. Further, the router device sets, for instance, a time 8/7 times as long as a time until the lease period elapses after the IP address is obtained to a Rebinding Time of default in the user terminal device 13.

The user terminal device 13 is designed to send a request for extending the lease period again to the DHCP server unit 5 after the set Renewing Time elapses. Further, when the DHCP server unit 5 does not respond to the request for extending the lease period again, the user terminal device 13 is designed to send a packet for searching the DHCP server after the set Rebinding Time elapses.

Accordingly, when the lease period (a first lease period) that the DHCP server unit 5 transmits to the user terminal device 13 is set to be short, the frequency of generation of the request for extending the lease period that the user terminal device 13 transmits to the DHCP server unit 5 may be possibly increased. On the contrary, when the lease period that the DHCP server unit 5 transmits to the user terminal device 13 is set to be long, the frequency of generation of the request for extending the lease period that the user terminal device 13 transmits to the DHCP server unit 5 can be decreased.

When the frequency of generation of the request for extending again the lease period is increased, the traffic of the network of the LAN side of the router device 1 is increased and the processing performance of the router device 1 and the user terminal device 13 is deteriorated. However, when network connecting information (information that allows the user terminal device 13 to be connected to the network) included in a DHCP message to be reported to the user terminal device 13 is changed in a short time due to the change of an internal or external network environment of the router device 1, the frequency of generation of the request for extending again the lease period needs to be increased so that the user terminal device 13 can obtain the latest DHCP message as fast as possible.

Thus, in the first embodiment, the DHCP server unit 5 of the router device 1 is designed to dynamically change the lease period in accordance with the change of the environment of the internal network and the external network of the router device 1 (self-device). Accordingly, the router device 1 can suppress the above-described increase of the traffic of the network and the deterioration of the processing performance, and can inform the user terminal device 13 of the latest DHCP message within the Renewing Time set to a maximum value.

Now, an operation of the router device 1 constructed as described above will be explained below.

The DHCP server unit 5 selects one IP address from an address pool held by itself for a request for the IP address from the user terminal device 13 connected to the LAN interface unit 4 and assigns the IP address to the user terminal device 13 that outputs the request.

At that time, to the DHCP message transmitted to the user terminal device 13 from the DHCP server unit 5, the IP address and the lease period of the assigned IP address are attached. Further, from the DHCP server unit 5 to the user terminal device 13, various kinds of information can be transmitted that is necessary for the user terminal device 13 to use the network such as a DNS (Domain Name System) server address, a default gateway address or the like may be transmitted. Further, the IP address in the address pool has the same network address as that of the IP address of the LAN interface unit 4.

The DHCP client unit 6 requests the external DHCP server unit 12 to give the IP address of the WAN interface unit 2. Thus, the external DHCP server unit 12 responds to the request from the DHCP client unit 6 to select one IP address from an address pool held by the unit 12 and assign the IP address to the WAN interface unit 2.

At this time, when the IP address assigned to the WAN interface unit 2 has the same network address as the network address of the IP address previously assigned to the LAN interface unit 4, the router device 1 has the same segment in the WAN side and the LAN side. Therefore, the router unit 3 cannot decide to which interface a transmitted packet is to be routed to generate a state that a communication cannot be made in the router device 1.

To avoid such a state (a communication unable state), the address deciding unit 7 decides whether or not the IP address assigned to the WAN interface unit 2 has the same network address as that of the IP address of the LAN interface unit 4.

Then, when the address deciding unit 7 decides that the network address is the same, the DHCP server unit 5 changes the IP address of the LAN interface unit 4 and also changes completely IP addresses in the address pool held by the DHCP server unit 5 to addresses having the same network address of the changed IP address of the LAN interface unit 4.

However, if the IP address is already assigned to the user terminal device 13 when the address deciding unit 7 decides that the network address is the same, the IP address of the user terminal device 13 needs to be changed. Thus, the router device 1 changes the IP address of the user terminal device 13 by using the above-described protocol of the DHCP.

Now, a process (a process for changing the IP address of the user terminal device 13) when the network addresses of the IP addresses of the WAN side and the LAN side are duplicated will be described below by referring to a flowchart shown in FIG. 5.

FIG. 5 shows the flowchart of an operation of the router device 1 in the first embodiment. In the router device 1, the process is shown when the network addresses of the IP addresses of the WAN side and the LAN side are duplicated.

In FIG. 5, the DHCP server unit 5 sets the lease period when the DHCP server unit 5 assigns the IP address to the user terminal device 13 through the LAN interface unit 4 to be short (step 1).

The DHCP server unit 5 sets the lease period to, for instance, 6 seconds as one example of the lease period. The user terminal device 13 to which the IP address whose lease period is set to be short is assigned by the DHCP server unit 5 transmits to the DHCP server unit 5 a request for extending again the lease period at intervals of 3 seconds half as long as the lease period.

When the user terminal device 13 is connected to the LAN interface unit 4, the user terminal device 13 requests the DHCP server unit 5 to assign the IP address thereto through the LAN interface unit 4 (step 2).

Them the DHCP server unit 5 assigns the IP address to the user terminal device 13. At that time, the DHCP server unit 5 informs the user terminal device 13 of the lease period (6 seconds) of the IP address included in the DHCP message (step 3).

Then, the router device 1 checks whether or not the WAN interface unit 2 is connected to the external network and the IP address is assigned to the WAN interface unit 2 (step 4).

When the WAN interface unit 2 is connected to the external network, the router device 1 shifts to a process of step 7. When the WAN interface unit 2 is not connected to the external network, the router device 1 shifts to a process of step 5.

When the WAN interface unit 2 is not connected to the external network and the IP address is not assigned to the WAN interface unit (step 4, No), the DHCP client unit 6 requests the external DHCP server unit 12 to assign the IP address to the WAN interface unit 2 (step 5). It is assumed that the IP address of the WAN interface unit 2 is not statically determined and determined by the external DHCP server unit 12.

The external DHCP server unit 12 responds to the request for the IP address to assign the IP address to the WAN interface unit 2 (step 6).

On the other hand, when the WAN interface unit 2 is connected to the external network and the IP address is assigned to the WAN interface unit 2 (step 4, Yes), the router device 1 initially checks whether or not the network addresses of the WAN side and the LAN side are the same to detect the above-described communication unable state (step 7). Specifically, the address deciding unit 7 checks whether or not the network addresses of the IP addresses respectively assigned to the WAN interface unit 2 and the LAN interface unit 4 are the same.

When the network addresses of the WAN side and the LN side are the same (step 7, yes), the router device 1 recognizes the WAN side and the LA side have the same segment to avoid the communication unable state due to the same network address. That is, when the network addresses of the WAN side and the LAN side are duplicated, the router device 1 carries out a process for changing the network address of the LAN side (step 8). Specifically, the router device 1 carries out a process for changing the network addresses of the IP address of the LAN interface unit 4 and the IP addresses held by the DHCP server unit 5 to assign the IP address to the user terminal device 13 from, for instance, 192. 168. 0. 0/24 to 192. 168. 10. 0/24. Thus, the router device 1 avoids the network addresses of the WAN side and the LAN side from being duplicated.

Then, the router device 1 informs the user terminal device 13 of the change of the IP address of the LAN side carried out in the step 8. Since the lease period is set to 6 seconds by the process of the step 1, after the user terminal device 13 is connected to the router device 1, the user terminal device 13 sends a request for extending the lease period again to the DHCP server unit 5 at intervals of 3 seconds. Accordingly, the DHCP server unit 5 can inform the user terminal device 13 of a response to the request for extending the lease period again for the IP address changed in the step 8 within 3 seconds at maximum.

The user terminal device 13 receives the response to the request for extending the lease period again from the router device 1 to obtain the IP address again (step 9). Thus, the change of the address of the LAN side carried out in the process of the step 8 is reflected on the user terminal device 13 to release the duplicated state of the network addresses of the WAN side and the LAN side. In this case, when this state continues, the network traffic of the LAN side is increased and the processing performance of the router device 1 and the user terminal device 13 is deteriorated.

Thus, when the network addresses of the WAN side and the LAN side are not the same (step 7, No), the DHCP server unit 5 of the router device 1 sets the lease period to be greatly longer than the lease period (time) set in the process of the step 1 by the DHCP server unit 5.

For instance, the DHCP server unit 5 sets the lease period set to 6 seconds so far to one hour (step 10). Thus, when the user terminal device 13 subsequently requests to extend the lease period again (after 3 seconds), the lease period that the user terminal device 13 obtains from the router device 1 is one hour.

Accordingly, the user terminal device 13 changes a setting to one hour. The user terminal device 13 subsequently requests to extend the lease period again after 30 minutes half as long as one hour. As a result, the network traffic of the LAN side due to the DHCP is subsequently extremely lowered and the processing performance of the user terminal device 13 is improved.

Usually, since the lease time is ordinarily long, for instance, one hour and a fixed value, there is no unit for effectively informing the user terminal device 13 of the change of the address due to the duplication of the network addresses of the WAN side and the LAN side as described above. Therefore, the user terminal device 13 may be possibly brought to a state that the communication cannot be made until the Renewing Time set to a long time elapses.

Further, when a lease period is set to be short to a second unit, the packets of a DHCP are frequently supplied on the network of a LAN side, so that the network traffic of the LAN side is extremely increased and the processing performance of a user terminal device 13 is deteriorated.

In the router device 1 of the first embodiment, the lease period of the IP address transmitted by the DHCP server unit 5 is dynamically changed as described above. Thus, the change of the address can be reported to the user terminal device 13 in a short time and the frequency of generation of the requests for extending the lease period again from the user terminal device 13 can be controlled. Accordingly, the increase of unnecessary traffic or the deterioration of the processing performance of the user terminal device 13 can be suppressed.

As described above, according to the first embodiment, a general-purpose arrangement can be provided in which the DHCP server unit 5 in the router device 1 provides network connecting information to the user terminal device 13 connected to the LAN side at a necessary timing, the network traffic is not increased and the processing performance is not deteriorated. Accordingly, the user terminal device 13 connected to the LAN side can be efficiently connected to the network.

Second Embodiment

A router device 1 of a second embodiment will be described below. The structure of the router device 1 is the same as that of the first embodiment.

In the second embodiment, the radio module 60 or the radio LAN controller 59 shown in FIG. 4 are used, the router device 1 is connected to the terminal device 13 by a radio LAN, and for instance, a case is assumed that the router devices 1 are used in the hot spots of the streets.

In such a case, a connecting state between the LAN interface unit 4 (including a modular jack for a wired LAN and antennas 63 and 64 for a radio LAN shown in FIG. 4) and the user terminal device 13 may be possibly unstable. For instance, when a radio wave environment is bad, or when a plurality of users (user terminal device 13) pass the hot spots one by one, the router device 1 is repeatedly connected to and disconnected from the user terminal device 13.

As described above, when the connecting state between the LAN interface unit 4 and the user terminal device 13 is unstable, if the lease period of the IP address assigned to the user terminal device 13 by the DHCP server unit 5 is long, many IP addresses that are not actually used are assigned thereto, so that the IP addresses are wasted.

Thus, in the second embodiment, the connection stability of the LAN interface unit 4 and the user terminal device 13 is evaluated by the connection stability evaluating unit 8. When an evaluated result is high, the lease period is extended, and when the evaluated result is low, the lease period is shortened.

At this time, as an index for evaluating the connection stability, any of evaluation indexes indicating that the user terminal device 13 continuously operates in a stable way may be used, such as the radio strength of the radio LAN, a connecting time of the LAN interface unit 4 and the user terminal device 13, the number of packers supplied between the LAN interface unit 4 and the user terminal device 13 and a plurality of indexes may be combined together.

While the connection stability between the LAN interface unit 4 and the user terminal device 13 is low, the lease period of the IP address assigned to the user terminal device 13 by the DHCP server unit 5 is shortened. Thus, even when there are many user terminal devices 13 that cannot be connected to the LAN interface unit 4, the addresses assigned thereto are released in a short time. Since the address assigned to the user terminal device 13 is released in a short time, the IP address can be prevented from being wastefully assigned to the user terminal device 13.

On the other hand, as the connection stability of the LAN interface unit 4 and the user terminal device 13 is more increased, the lease period of the IP address assigned to the user terminal device 13 by the DHCP server unit 5 is extended. Thus, the frequency of generation of the requests for extending the lease period again can be reduced, and the increase of the traffic of the network in the LAN side and the deterioration of the processing performance of the user terminal device 13 and the router device 1 can be prevented.

When the lease period is set to obtain the connection stability, the lease period (short or long) may be set in accordance with the evaluated result (high or low) of the connection stability. When the evaluated result of the connection stability is higher than the evaluated result of a connection stability immediately before the former connection stability, the lease period may be set to be longer than a present lease period. When the evaluated result of the connection stability is lower than the evaluated result of a connection stability immediately before the former connection stability, the lease period may be set to be shorter than a present lease period. Namely, the lease period for the connection stability may be set on the basis of the absolute evaluation of the connection stability or the relative evaluation of the connection stability.

As described above, according to the second embodiment, the connection stability evaluating unit 8 can change the setting of the lease period in accordance with the evaluated result (change) of the connection stability between the LAN interface unit 4 and the user terminal device 13.

Accordingly, whether the IP address whose lease period is short is assigned to the user terminal device to prevent a wasteful IP address from being assigned, or the IP address whose lease period is long is assigned to the user terminal device to reduce the frequency of generation of the requests for extending the lease period again can be selected so that the increase of the traffic of the network of the LAN side is prevented or the deterioration of the processing performance of the user terminal device 13 and the router device 1 is prevented. Therefore, the user terminal device connected to the LAN side can be efficiently connected to the network.

Third Embodiment

A router device 1 of a third embodiment will be described below. The structure of the router device 1 is the same as that of the first embodiment.

In a DHCP message that an external DHCP server unit 12 sends to a DHCP client unit 6, IP addresses of various servers (for instance, a DNS server or an NTP (Network Time Protocol) server on the internet 10 or the like) including an ISP server 11 can be included as options.

Prescribed information of the information (refer it simply to as "server information", hereinafter) of the servers on the internet 10 may be required not only in the router device 1, but also in a user terminal device 13.

In this case, the server information may possibly vary in a short time. Accordingly, a lease period (second lease period) set by the external DHCP server unit 12 may be possibly set to be short.

In such a case, the change of the server information is not transmitted to the user terminal device 13 depending on the length of a lease period set by a DHCP server unit 5 so that an inconvenience may arise for a user (user terminal device 13).

Thus, in the third embodiment, the router device 1 is formed so that the lease period (first lease period) set by the DHCP server unit 5 is set in association with the lease period set by the external DHCP server unit 12.

Specifically, the lease period of the DHCP server unit 5 is set in the prescribed ratio of the same as the lease period of the external DHCP server unit 12 or 50% as long as the lease period of the external DHCP server unit 12 to avoid the above-described inconvenience.

As described above, according to the third embodiment, the DHCP server unit 5 sets as the lease period of the IP address set to the user terminal device 13 a prescribed value based on the lease period of the IP address set to the user terminal device 13 by the external DHCP server unit 12. Thus, the frequency of generation of the requests for extending the lease period again to the external DHCP server unit 12 can be related to the frequency of generation of the requests for extending the lease period again from the user terminal device 13. Thus, even when the information in the DHCP message reported from the external DHCP server unit 12 changes, changed information can be reported to the user terminal device 13 at timing corresponding to the change. Accordingly, the inconvenience for the user terminal device 13 that the change of the server information is not transmitted to the user terminal device 13 can be easily avoided.

This application is based upon and claims the benefit of priority of Japanese Patent Application No. 2006-187561 filed on Jul. 7, 2006, the contents of which are incorporated herein by reference in its entirety.

The invention claimed is:

1. A communication device that carries out a routing operation of data between a first network and a second network, said communication device comprising:
    a first interface connected to the first network;
    a second interface connected to the second network; and
    a processor that assigns an internet protocol (IP) address to
        a user terminal device connected to the first interface in accordance with a dynamic host configuration protocol (DHCP), wherein the processor changes a first lease period of the IP address set when the processor assigns the IP address to the user terminal device in accordance with the change of a network environment, wherein:
    the processor evaluates the stability of a connection of a communication between the first interface and the user terminal device and changes the first lease period in accordance with an evaluated result, and
    when the processor decides that the evaluated result of the stability of the connection of the communication is lower than a prescribed value, the processor sets the first lease period to be shorter than a prescribed period, and when the processor decides that the evaluated result is higher than the prescribed value, the processor sets the first lease period to be longer than the prescribed period.

2. The communication device of claim 1, wherein the first network is a radio network and the connection stability is evaluated on the basis of radio strength.

3. The communication device of claim 1, wherein the connection stability is evaluated on the basis of a connecting time of the first interface and the user terminal device.

4. The communication device of claim 1, wherein the connection stability is evaluated on the basis of the number of packets supplied between the first interface and the user terminal device.

5. A communication device that carries out a routing operation of data between a first network and a second network, said communication device comprising:
   a first interface connected to the first network; and
   a second interface connected to the second network; and
   a processor that assigns an internet protocol (IP) address to a user terminal device connected to the first interface in accordance with a dynamic host configuration protocol (DHCP), wherein the processor changes a first lease period of the IP address set when the processor assigns the IP address to the user terminal device in accordance with the change of a network environment, wherein:
   the processor evaluates the stability of a connection of a communication between the first interface and the user terminal device and changes the first lease period in accordance with an evaluated result, and
   the processor decides that the evaluated result of the stability of the connection of the communication is lower than an evaluated result of a stability immediately before the former evaluated result, the processor sets the first lease period to be shorter than a lease period immediately before the first lease period, and when the processor decides that the evaluated result is higher than the evaluated result of a stability immediately before the former evaluated result, the processor sets the first lease period to be longer than a lease period immediately before the first lease period.

6. The communication device of claim 5, wherein the first network is a radio network and the connection stability is evaluated on the basis of radio strength.

7. The communication device of claim 5, wherein the connection stability is evaluated on the basis of a connecting time of the first interface and the user terminal device.

8. The communication device of claim 5, wherein the connection stability is evaluated on the basis of the number of packets supplied between the first interface and the user terminal device.

9. A communication device that carries out a routing operation of data between a first network and a second network, said communication device comprising:
   a first interface connected to the first network;
   a second interface connected to the second network; and
   a processor that assigns a first Internet Protocol (IP) address and a first lease period of the first IP address to a user terminal device connected to the first interface in accordance with a dynamic host configuration protocol (DHCP),
   wherein when the processor obtains a second IP address of the second interface from an external DHCP server on the second network, the processor changes a length of the first lease period.

10. The communication device according to claim 9, wherein when the processor decides that the second IP address assigned to the second interface and the first IP address assigned to the user terminal device connected to the first interface are the same network address, the processor changes the first IP address assigned to the user terminal device connected to the first interface.

11. The communication device according to claim 9, wherein the processor decides that the second IP address assigned to the second interface and the first IP address assigned to the user terminal device connected to the first interface are not the same network address, the processor changes the length of the first lease period to be longer than the lease period before a decision.

12. The communication device of claim 9, wherein the first interface is a LAN (local area network) interface and the second interface is a WAN (wide area network) interface.

13. A control method for a communication device that carries out a routing operation of data between a first network and a second network, said control method comprising the steps of:
   assigning a first Internet Protocol (IP) address and a first lease period of the first IP address to a user terminal device connected to the first interface in accordance with a dynamic host configuration protocol (DHCP);
   obtaining a second IP address of a second interface from an external DHCP server on the second network; and
   changing a length of the first lease period in accordance with a decided result.

14. The control method according to claim 13, further comprising after determining that the second IP address assigned to the second interface and the first IP address assigned to the user terminal device connected to the first interface are the same network address, changing the first IP address assigned to the user terminal device connected to the first interface.

15. The control method according to claim 13, further comprising after determining that the second IP address assigned to the second interface and the first IP address assigned to the user terminal device connected to the first interface are not the same network address, changing the length of the first lease period to be longer than the lease period which applied before said determining operation.

* * * * *